(12) United States Patent
Chen et al.

(10) Patent No.: US 12,082,089 B2
(45) Date of Patent: Sep. 3, 2024

(54) METHOD FOR DEPLOYMENT MULTI-ACCESS EDGE COMPUTING APPLICATION

(71) Applicant: ZTE CORPORATION, Guangdong (CN)

(72) Inventors: Lijuan Chen, Shenzhen (CN); Qiang Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/339,388

(22) Filed: Jun. 22, 2023

(65) Prior Publication Data

US 2024/0040355 A1 Feb. 1, 2024

Related U.S. Application Data

(63) Continuation of application No. PCT/CN2021/074006, filed on Jan. 27, 2021.

(51) Int. Cl.
*H04W 4/50* (2018.01)
*H04L 41/40* (2022.01)

(52) U.S. Cl.
CPC ............... *H04W 4/50* (2018.02); *H04L 41/40* (2022.05)

(58) Field of Classification Search
CPC ................................. H04W 4/50; H04L 41/40
See application file for complete search history.

(56) References Cited

U.S. PATENT DOCUMENTS

| | | | | |
|---|---|---|---|---|
| 2020/0296155 | A1* | 9/2020 | McGrath | G06F 9/5027 |
| 2021/0250250 | A1* | 8/2021 | Reznik | H04L 41/5019 |
| 2023/0041981 | A1* | 2/2023 | Srinivasan | H04L 41/0895 |
| 2023/0164241 | A1* | 5/2023 | Filippou | H04L 63/08 |
| | | | | 709/201 |

FOREIGN PATENT DOCUMENTS

| | | |
|---|---|---|
| CN | 110912722 A | 3/2020 |
| CN | 111726241 A | 9/2020 |
| WO | WO-2017/035735 A1 | 3/2017 |
| WO | WO-2017/041508 A1 | 3/2017 |
| WO | WO-2019/191108 A1 | 10/2019 |
| WO | WO-2019/236755 A1 | 12/2019 |

OTHER PUBLICATIONS

ETSI, ETSI GS MEC 010-2 V2.1.1 Multi-access Edge Computing (MEC); MEC Management; Part 2: Application lifecycle, rules and requirements management, Nov. 2019, p. 1-134 (Year: 2019).*

(Continued)

*Primary Examiner* — Tonia L Dollinger
*Assistant Examiner* — Joseph M Cousins
(74) *Attorney, Agent, or Firm* — Foley & Lardner LLP (57) ABSTRACT

Method, systems and devices for receiving, by a platform manager node, virtualization network function, VNF, instance information from a wireless communication node; selecting, by the platform manager node, a multi-access edge computing platform, MEP from candidate MEPs according to the VNF instance information; and transmitting, by the platform manager node, a first configuration request comprising the VNF instance information to the selected MEP.

6 Claims, 11 Drawing Sheets

(56) References Cited

OTHER PUBLICATIONS

ETSI, ETSI GS MEC 003 V2.1.1 Multi-access Edge Computing (MEC); Framework and Reference Architecture, Jan. 2019, p. 1-21 (Year: 2019).*

ETSI, ETSI GR MEC 017 V1.1.1 (Feb. 2018) Mobile Edge Computing (MEC); Deployment of Mobile Edge Computing in an NFV environment, Feb. 2018, p. 1-32 (Year: 2018).*

3rd Generation Partnership Project, "Technical Specification Group Services and System Aspects; Security; Lawful Interception (LI) architecture and functions (Release 16)", 3GPP TS 33.127, V16.6.0, Dec. 2020, Valbonne, France (99 pages).

Huawei, "pCR 28.814 support of MEC for EAS LCM management", 3GPP TSG-SA5 Meeting #133e, S5-205052, Oct. 21, 2020, e-Meeting (3 pages).

Intel, "Paper to discuss edge computing management issues", 3GPP TSG SA WG5 (Telecom Management) Meeting #115, S5-175180, Busan, Korea, Oct. 20, 2017 (4 pages).

International Search Report and Written Opinion for PCT Appl. No. PCT/CN2021/074006, mailed Oct. 27, 2021 (9 pages).

* cited by examiner

METHOD FOR DEPLOYMENT MULTI-ACCESS EDGE COMPUTING APPLICATION

This application is a continuation of PCT/CN2021/074006, filed Jan. 27, 2021, the content of which is incorporated herein by reference in its entirety.

TECHNICAL FIELD

This document is directed generally to wireless communications, and in particular to multi-access edge computing (MEC).

BACKGROUND

In a network function virtualization (NFV) environment, MEC applications can be regarded as virtualized network functions (VNFs) by NFV management and orchestration (MANO) components. An MEC system may delegate some orchestration and life cycle management (LCM) tasks to an NFV-MANO system (also referred to as NFV-MANO in this disclosure).

SUMMARY

In some approaches, procedures and application programming interfaces (APIs) for an MEAO (Multi-access Edge Application Orchestrator) to trigger an NFV-MANO system instantiating an MEC application are used. However, it is still unclear how to use an OSS (Operations support system) or a BSS (Business support system) to trigger the NFV-MANO system instantiating a VNF instance which is used in the MEC system.

Some aspects of the present disclosure relate to methods, systems, and devices for transmitting VNF instance information to a target multi-access edge computing platform (MEP).

One aspect of the present disclosure relates to a wireless communication method. In an embodiment, the wireless communication method includes receiving, by a platform manager node, virtualization network function, VNF, instance information from a wireless communication node; selecting, by the platform manager node, a multi-access edge computing platform, MEP from candidate MEPs according to the VNF instance information; and transmitting, by the platform manager node, a first configuration request comprising the VNF instance information to the selected MEP.

Another aspect of the present disclosure relates to a wireless communication method. In an embodiment, the wireless communication method includes selecting, by an orchestrator node, a multi-access edge platform manager-network function virtualization, MEPM-V, from candidate MEPM-Vs according to VNF instance information; and transmitting, by the orchestrator node, the VNF instance information to the selected MEPM-V, wherein the selected MEPM-V is configured to manage an MEP.

Another aspect of the present disclosure relates to a wireless communication method. In an embodiment, the wireless communication method includes receiving, by an edge computation platform node, VNF instance information from an MEPM-V; wherein the MEPM-V selects the edge computation platform node from candidate nodes according to the VNF instance information.

Another aspect of the present disclosure relates to a wireless communication method. In an embodiment, the wireless communication method includes transmitting, by a virtualization managing node, VNF instance information to an OSS or a BSS; wherein the VNF instance information is used to select an MEP from candidate MEPs, and the VNF instance information is transmitted to the selected MEP.

Another aspect of the present disclosure relates to a platform manager node. In an embodiment, the platform manager node includes a communication unit and a processor. The processor is configured to receive virtualization network function, VNF, instance information from a wireless communication node; select a multi-access edge computing platform, MEP from candidate MEPs according to the VNF instance information; and transmitting a first configuration request comprising the VNF instance information to the selected MEP.

Another aspect of the present disclosure relates to an orchestrator node. In an embodiment, the orchestrator node includes a communication unit and a processor. The processor is configured to select a multi-access edge platform manager-network function virtualization, MEPM-V, from candidate MEPM-Vs according to VNF instance information; and transmit the VNF instance information to the selected MEPM-V, wherein the selected MEPM-V is configured to manage an MEP.

Another aspect of the present disclosure relates to an edge computation platform node. In an embodiment, the edge computation platform node includes a communication unit and a processor. The processor is configured to receive VNF instance information from an MEPM-V, wherein the MEPM-V selects the edge computation platform node from candidate nodes according to the VNF instance information.

Another aspect of the present disclosure relates to a virtualization managing node. In an embodiment, the virtualization managing node includes a communication unit and a processor. The processor is configured to transmit VNF instance information to an OSS or a BSS, wherein the VNF instance information is used to select an MEP from candidate MEPs, and the VNF instance information is transmitted to the selected MEP.

Various embodiments may preferably implement the following features:

Preferably or in some embodiments, the VNF instance information comprises location information of a corresponding VNF instance.

Preferably or in some embodiments, the wireless communication node is a Multi-access Edge Application Orchestrator, MEAO, and the platform manager node is configured to receive a second configuration request comprising the VNF instance information from the MEAO.

Preferably or in some embodiments, the wireless communication node is a VNF manager, VNFM, and the platform manager node is configured to subscribe a notification comprising the VNF instance information from the VNFM.

Preferably or in some embodiments, the platform manager node is configured to transmit the first configuration request to the MEP in response to the platform manager node being able to satisfy a location requirement in the VNF instance information.

Preferably or in some embodiments, the platform manager node is configured to acquire multi-access edge computing, MEC, configuration information by transmitting a request comprising the VNF instance information to an MEAO and to transmit the first configuration request to the MEP according to the MEC configuration information.

Preferably or in some embodiments, the platform manager node is configured to receive the VNF instance information from an MEC system portal.

Preferably or in some embodiments, the VNF instance information comprises location information of a corresponding VNF instance.

Preferably or in some embodiments, the orchestrator node is configured to receive the VNF instance information from an operations support system, OSS, or a business support system, BSS.

Preferably or in some embodiments, the orchestrator node is configured to transmit the VNF instance information to the MEPM-V according to location information of the VNF instance information.

Preferably or in some embodiments, the orchestrator node is configured to receive a subscribed notification comprising the VNF instance information from a Network Functions Virtualization Orchestrator, NFVO.

Preferably or in some embodiments, the orchestrator node is configured to provide MEC configuration information to the MEPM-V to allow the MEPM-V to transmit a configuration request to the MEP according to the MEC configuration information.

Preferably or in some embodiments, the orchestrator node is configured to receive the VNF instance information from an MEC system portal.

Preferably or in some embodiments, the VNF instance information is contained in a configuration request from an MEPM-V requesting for configuring the MEC application.

Preferably or in some embodiments, the edge computation platform node is configured to receive the VNF instance information from an MEC system portal.

Preferably or in some embodiments, the virtualization managing node is configured to determine the VNF instance information according to deployment location constraints from the OSS or the BSS if the deployment location constraints are provided.

Preferably or in some embodiments, the virtualization managing node is configured to transmit a subscribed notification comprising the VNF instance information to an MEAO.

Preferably or in some embodiments, the virtualization managing node is configured to transmit a subscribed notification comprising the VNF instance information to at least one MEPM-V.

Preferably or in some embodiments, the virtualization managing node is configured to select a VNFM to instantiate a VNF instance, and the selected VNFM transmit the subscribed notification according to location information of the VNF instance information.

Preferably or in some embodiments, the edge computation platform node is configured to receive the VNF instance information from an NFV management portal.

The present disclosure relates to a computer program product comprising a computer-readable program medium code stored thereupon, the code, when executed by a processor, causing the processor to implement a wireless communication method recited in any one of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
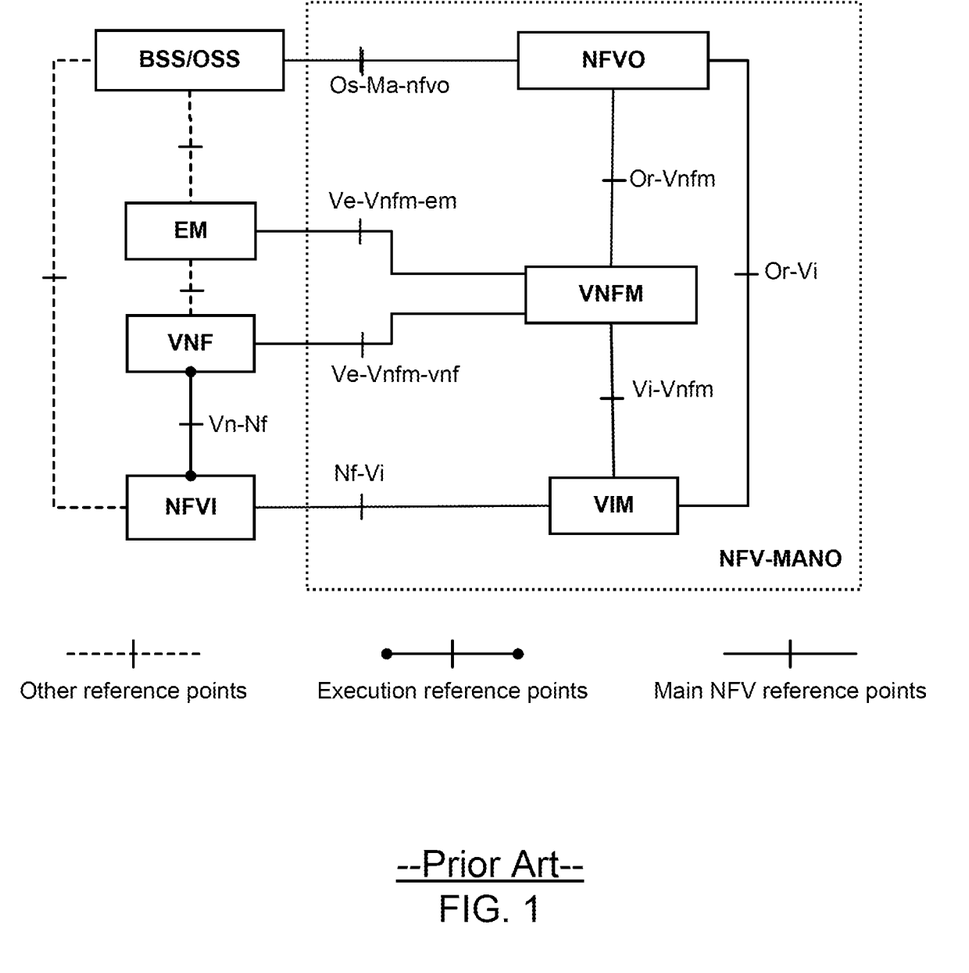
FIG. 1 shows architecture of European Telecommunications Standards Institute (ETSI) NFV according to an embodiment of the present disclosure.

In a non-virtualized network, network functions (NFs) are implemented by an integration of vendor specific software and hardware. The development of Network Function Virtualization (NFV) technology decouples the software from the hardware. As the network elements are no longer integrations of hardware and software, the developments of the software and hardware can be independent from each other. Virtualized network functions (VNFs) allow a network to fast and automatically respond the requirements for the traffic and services running over it. FIG. 1 illustrates architecture of European Telecommunications Standards Institute (ETSI) NFV according to an embodiment of the present disclosure.

Figure 2:
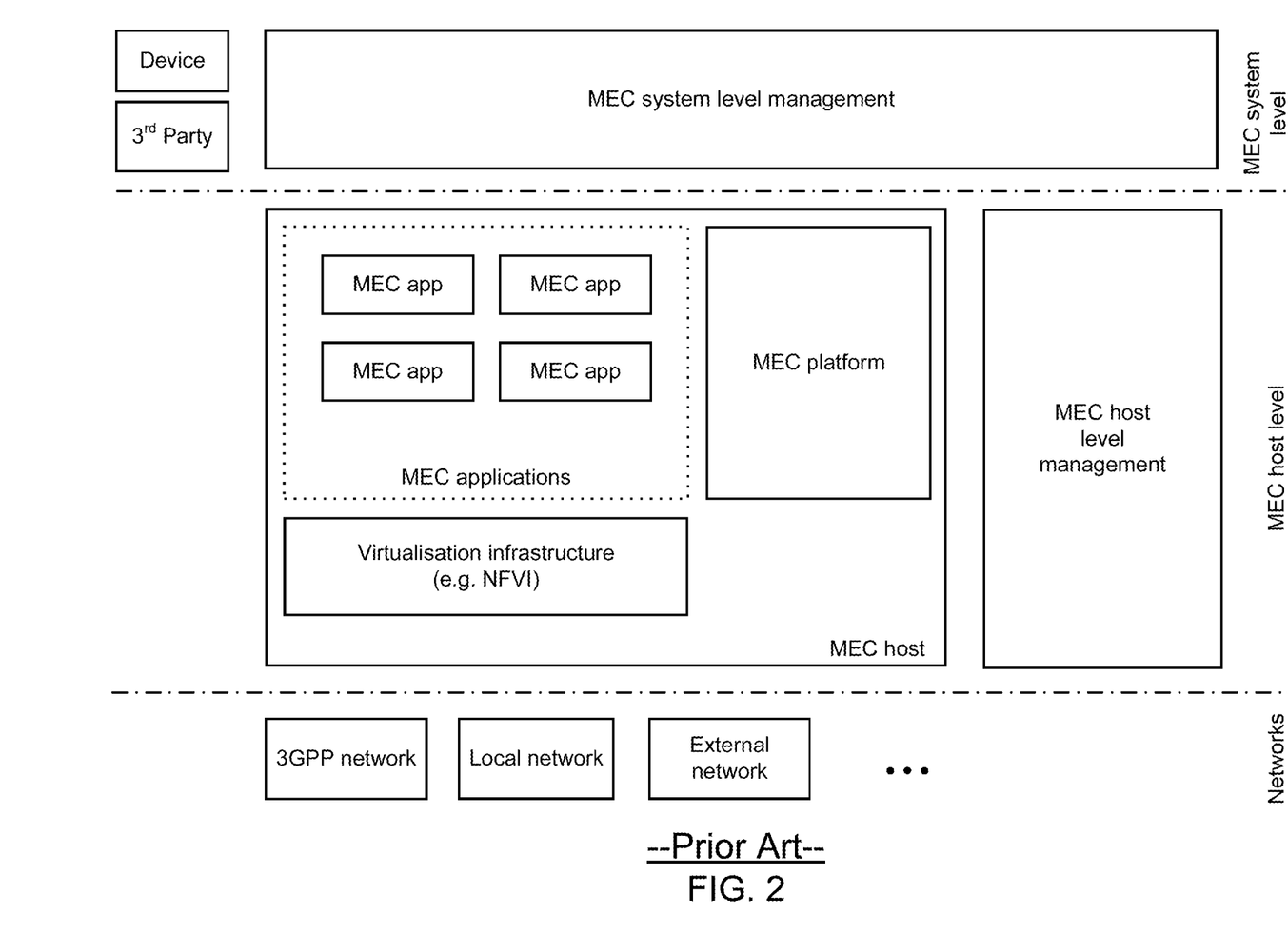
FIG. 2 shows a framework for the MEC and shows general entities involved in the MEC according to an embodiment of the present disclosure.

Multi-access Edge Computing (MEC) allows MEC applications to be software-only entities running in a virtualization infrastructure. FIG. 2 illustrates a framework for the MEC and shows general entities involved in the MEC according to an embodiment of the present disclosure.

Figure 3:
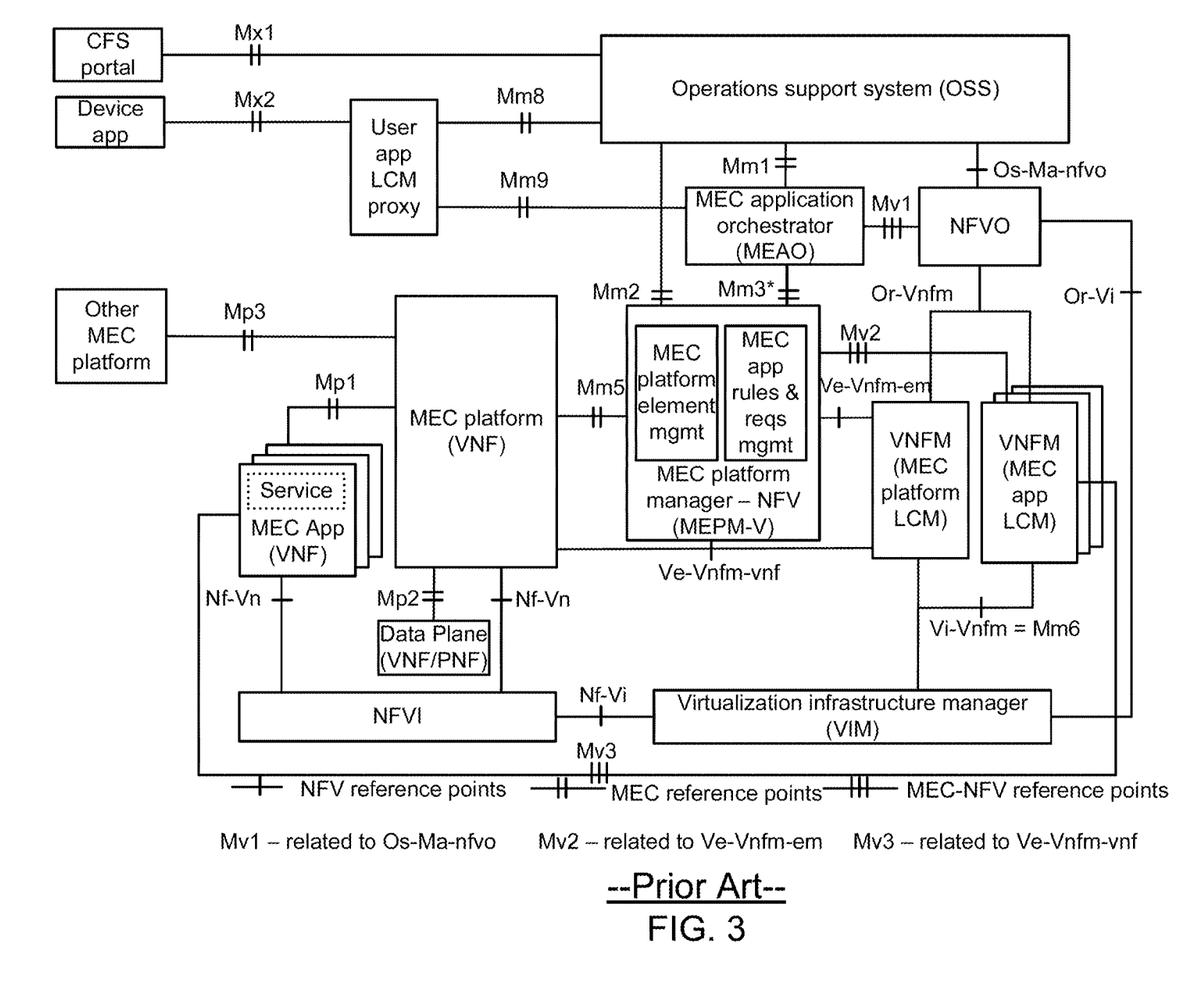
FIG. 3 shows an infrastructure of an MEC system deployment in an NFV environment according to an embodiment of the present disclosure.

MEC and the NFV are complementary concepts. The MEC infrastructure has been designed in a way that a number of different deployment options of MEC systems are possible. FIG. 3 depicts an infrastructure of an MEC system deployment in an NFV environment according to an embodiment of the present disclosure.

In an NFV environment, MEC applications can be regarded as virtualized network functions (VNFs) by NFV management and orchestration (MANO) components. An MEC system may delegate some orchestration and life cycle management (LCM) tasks to an NFV-MANO system and virtual network function manager (VNFM) functions. An MEC application for a VNF instantiation procedure (i.e., an LCM task) includes two parts:

1) The first part is instantiation the VNF for the MEC application, which includes creation of necessary virtualized resources and initial configuration of the VNF instance.

2) The second part is sending the configuration, which includes traffic rules, DNS rules, the required and optional services, services produced by the application instance, etc., to the MEC platform by an MEC platform manager-NFV (MEPM-V).

Figure 4:
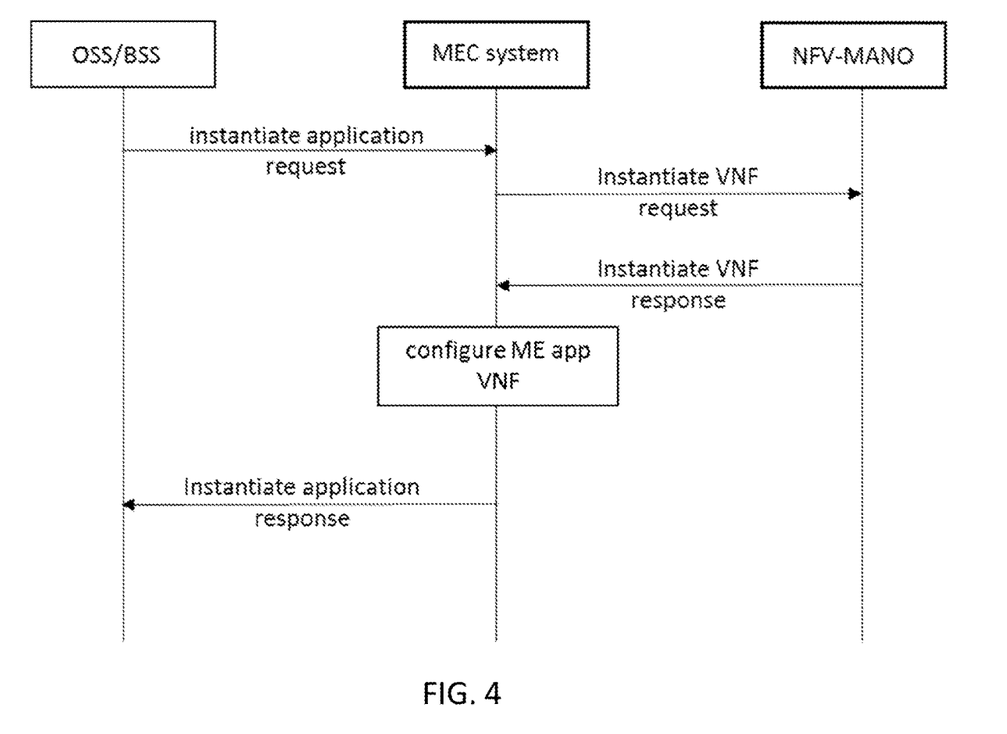
FIG. 4 shows a schematic diagram of a procedure for instantiating an NFV instance for an MEC application according to an embodiment of the present disclosure.

FIG. 4 shows a schematic diagram of a procedure for instantiating an NFV instance for an MEC application according to an embodiment of the present disclosure. In FIG. 4, the MEC system (e.g., an MEAO (multi-access edge application orchestrator) therein) triggers an NFV-MANO (e.g., an NFV-MANO system) to perform a VNF initialization procedure and to return all related information, especially the identifier (ID) of the created VNF instance, to the MEC system. Accordingly, the procedure shown in FIG. 4 can be regarded as an MEC system (or an MEAO) dominant procedure.

Figure 5:
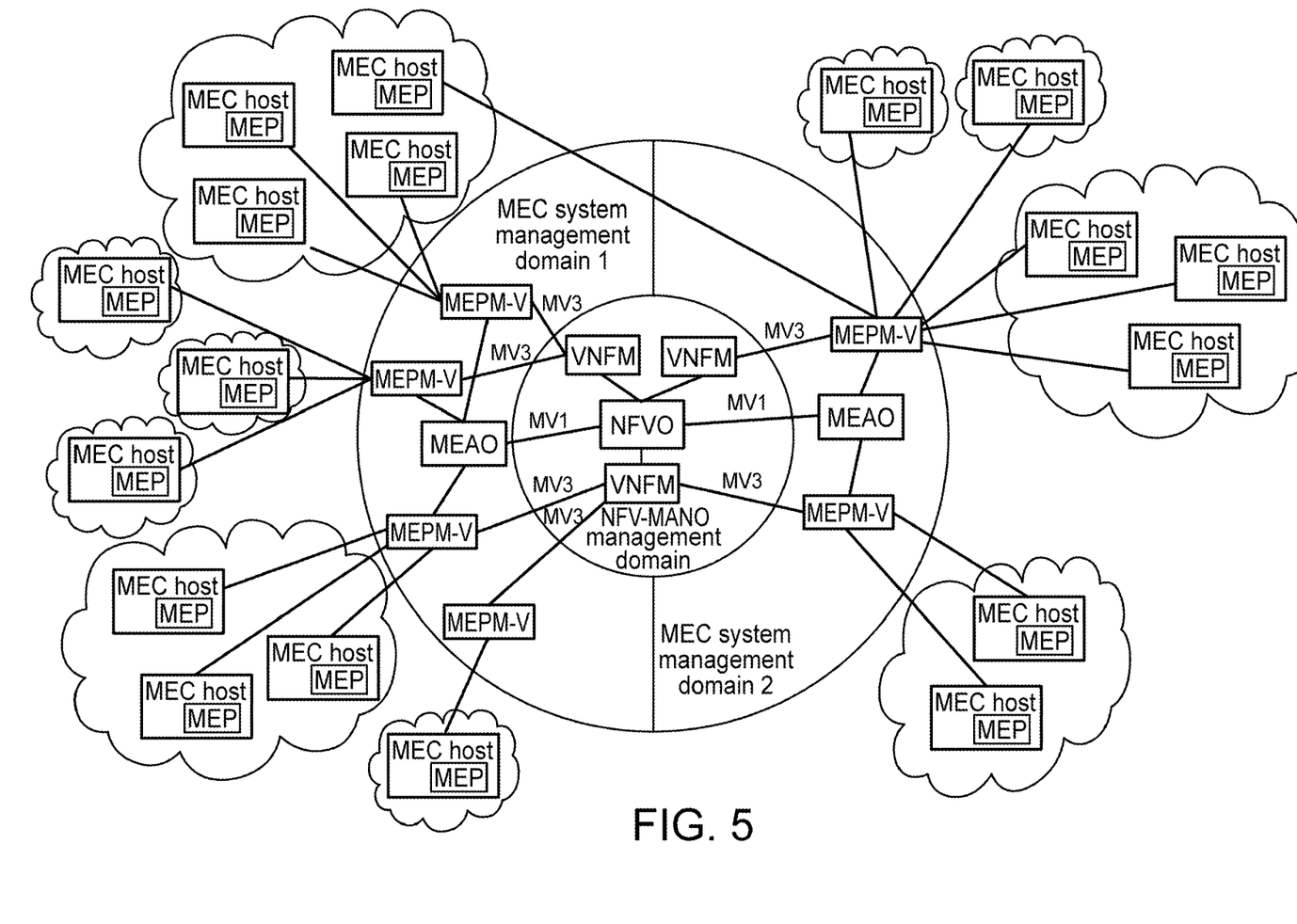
FIG. 5 shows a deployment environment consisting of an NFV-MANO system and an MEC system according to an embodiment of the present disclosure.
Figure 6:
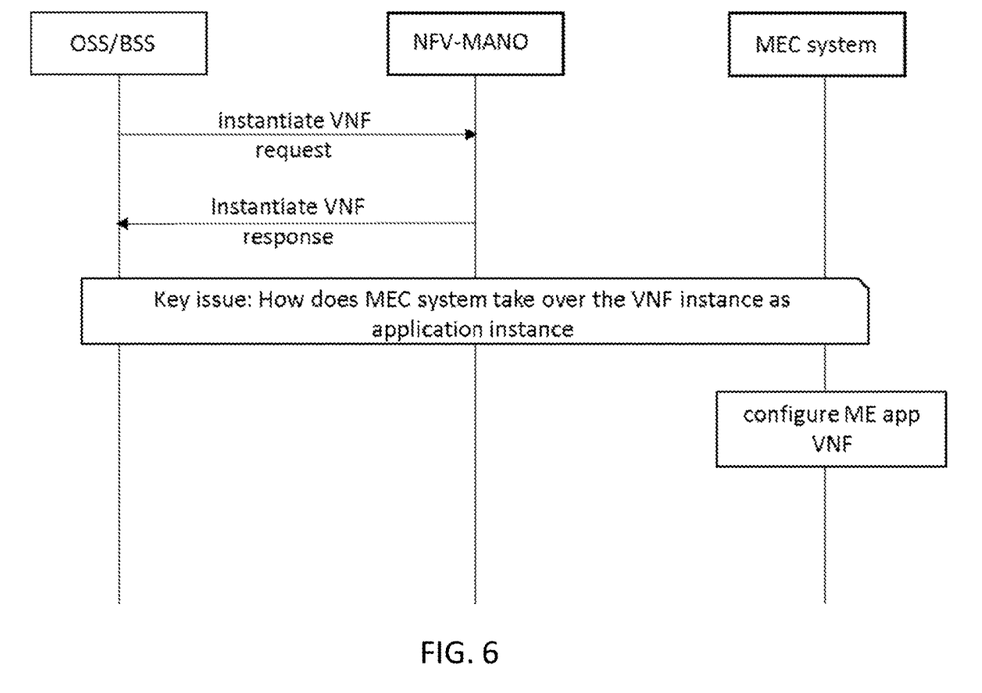
FIG. 6 shows a schematic diagram a method according to an embodiment of the present disclosure.

In a business environment, the MEC and the NFV may belong to different departments. An MEC management department may not be allowed to directly trigger the NFV-MANO to perform certain operations. In this scenario, a method for an operations support system (OSS) to trigger the NFV-MANO performing instantiation procedure is required. Then, the MEC system can take over the created VNF instance with an MEC application. Note that, the number of the MEAO, the MEPM-V, and/or the MEP in the MEC system may be different from what is shown in FIG. 3. There could be multiple MEAOs, MEPM-Vs, and/or MEPs in a more complex management topology. In addition, the management domain of the MEC system may not be exactly identical to the management domain of NFV-MANO. FIG. 5 illustrates a deployment environment according to an embodiment of the present disclosure, in which the management domain of an NFV-MANO covers the management domains of two MEC systems. The management domain of each MEC system management has multiple MEPM-Vs, each MEPM-V controls one or multiple MEC hosts, and the MEC hosts are deployed at different or the same NFVI (NFV Infrastructure) cite. The MEAOs in the management domain of each MEC system connects to an NFVO (network functions virtualization orchestrator) in the management domain of the NFV-MANO. The MEPM-Vs in the management domain of each MEC system connect to one of the VNFMs in the management domain of the NFV-MANO.

Compared with the MEC system in the embodiment corresponding to FIG. 4, the MEC system in FIG. 5 may not be able to acknowledge interactions between the OSS and the NFV-MANO. Thus, there is a need to figure out how to select the MEC host from all candidate hosts on the same site and how to let the selected MEC host to take over the VNF instance, so that the selected MEC host can continue to configure the MEC application for the VNF instance.

Figure 7:
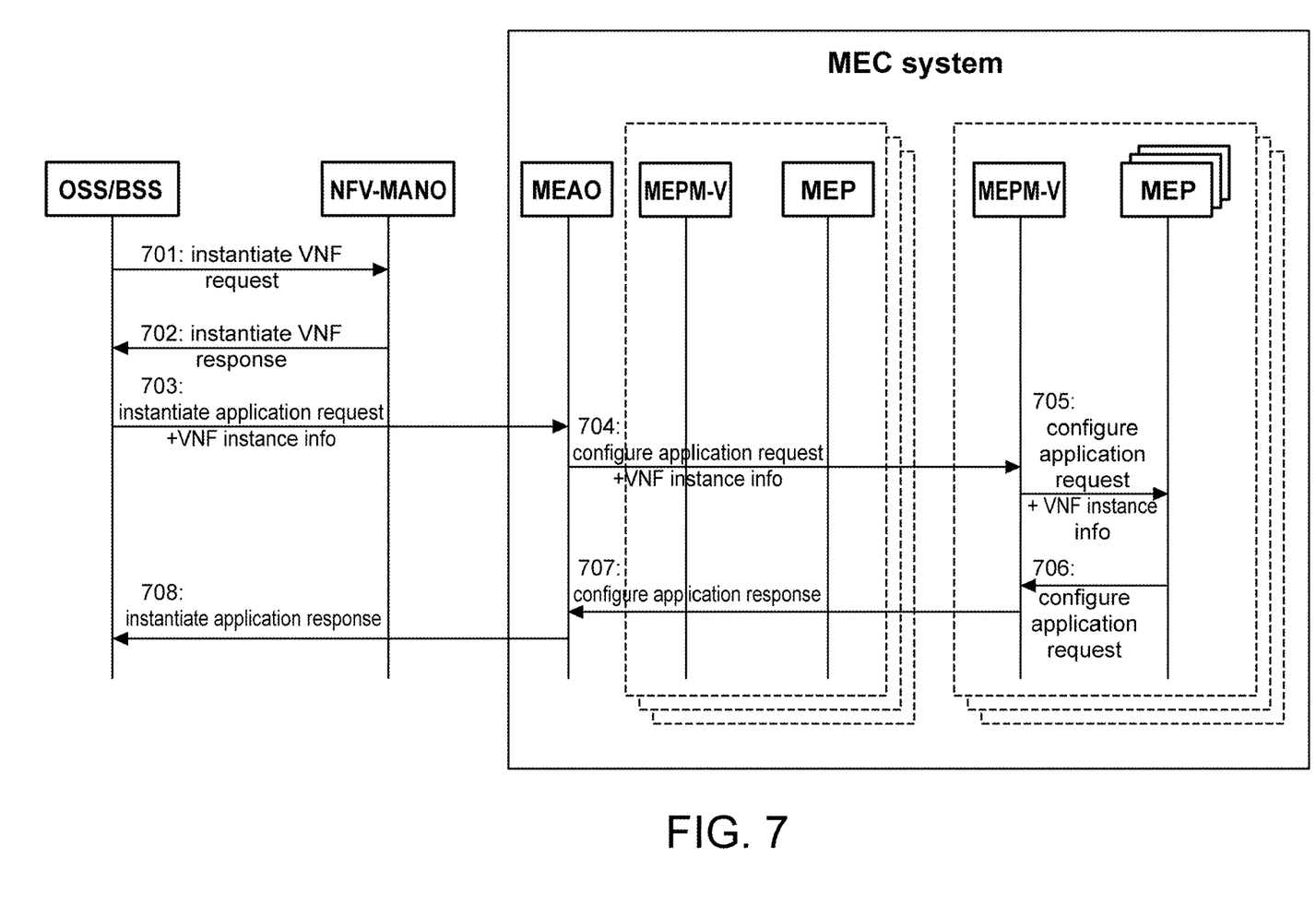
FIG. 7 shows a schematic diagram a method according to an embodiment of the present disclosure.

FIG. 7 shows a schematic diagram of a method according to an embodiment of the present disclosure. The method shown in FIG. 7 may be used to extend the interface between the OSS/BSS and the MEC system, to provide VNF instance information to the MEC system.

In an embodiment, the NFV-MANO is a managing system including an NFVO and at least one VNFM. In an embodiment, the NFV-MANO can be regarded as a network node (e.g., a virtualization managing node). In an embodiment, the NFV-MANO can be regarded as a network node including different functions and/or sub-nodes.

In this embodiment, an application package, which includes an application image, has been uploaded to the NFV-MANO as a VNF package. The NFV-MANO performs the instantiation according to the VNF package.

In this embodiment, the OSS/BSS requests the NFV-MANO to instantiate a VNF instance based on the application package (e.g., the VNF package). The deployment location constraints may also be sent to the NFV-MANO (step 701). In an embodiment, the deployment location constraints may be the location constraints for the VNF instance, such as coordinates of latitude and longitude, identifier of the data center, identifiers of data centers, identifiers of server racks, and identifiers of servers.

In step 702, after the VNF instance is instantiated as required, the NFV-MANO sends a response to the OSS/BSS.

It should be noted that, if there are no deployment location constraints in the request or the NFV-MANO has updated the deployment location constraints based on information of VNF instantiated location, the VNF instantiated location information is sent in the response as a parameter.

In step 703, the OSS/BSS requests the MEAO to instantiate an application. In an embodiment, VNF instance information (i.e., the information of the VNF instance) is transmitted in the request as a parameter. In an embodiment, the VNF instance includes location information of the VNF instance. In an embodiment, the location information of the VNF instance includes the deployment location constraints and/or the VNF instantiated location information mentioned above.

In an embodiment, if there are more than one MEC system in the area which meets requirement(s) in the VNF instance information (e.g., the deployment location constraints), the OSS/BSS sends the request to each of MEAOs of the MEC systems meeting the requirement(s) in the VNF instance information (e.g., the deployment location constraints).

In step 704, the MEAO select an MEC host based on the VNF instance information (e.g., the deployment location constraints). The MEAO sends a first configure application request to the MEPM-V which manages the selected MEC host, wherein the VNF information is included in the first configure application request as a parameter.

In step 705, the MEPM-V sends a second configure application request to the MEP on the selected MEC host, wherein the VNF information is included in the second configure application request as a parameter.

In step 706, the MEP sends a first configure application response to the MEPM-V. The MEPM-V sends a second configure application response to MEAO. The MEAO sends an instantiate application response to the OSS/BSS.

Figure 8:
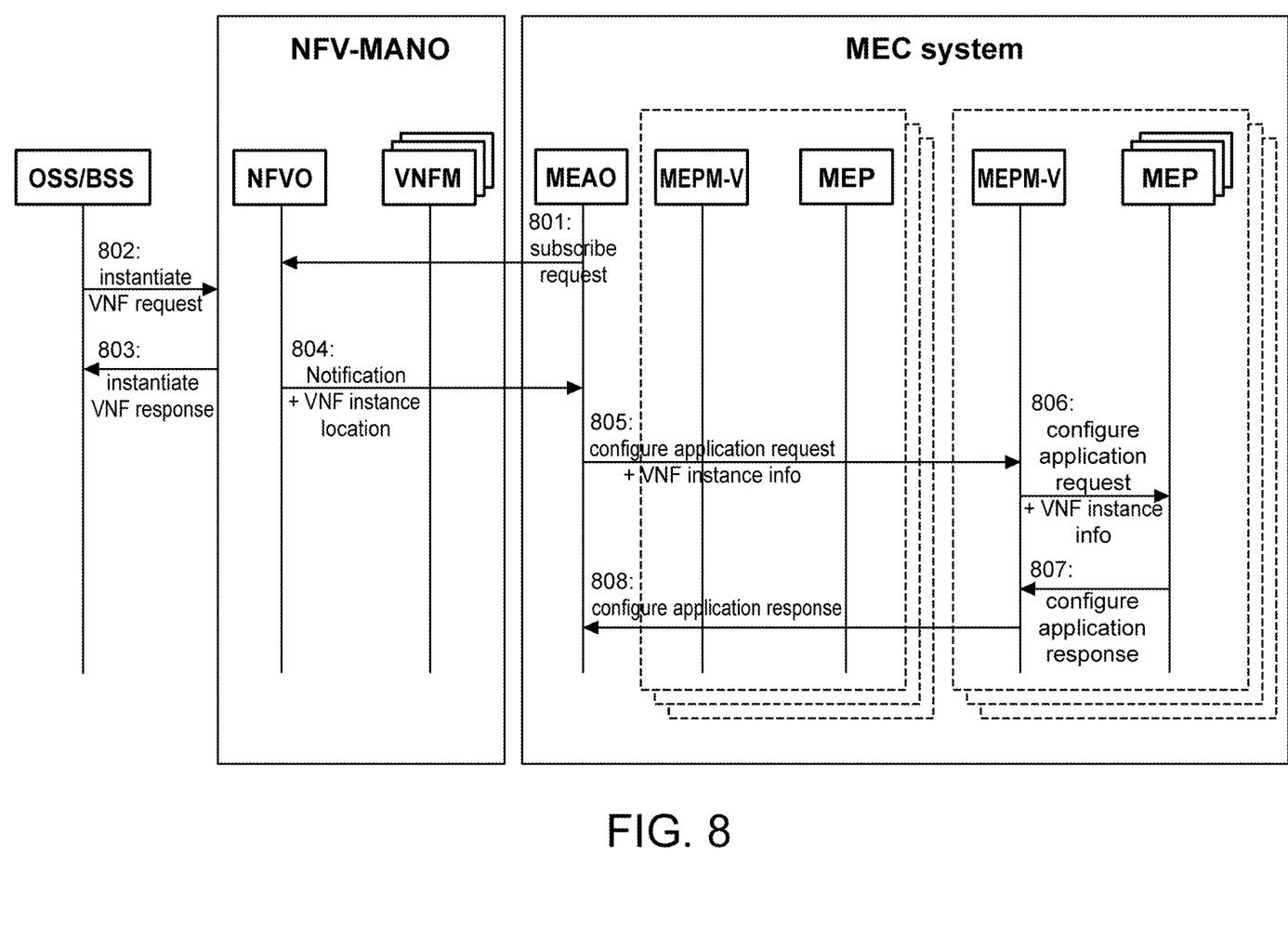
FIG. 8 shows a schematic diagram a method according to an embodiment of the present disclosure.

FIG. 8 shows a schematic diagram of a method according to an embodiment of the present disclosure. The method shown in FIG. 8 may be used to extend an interface between the NFV and the MEC system. In this embodiment, an application package, which includes the application image, has been uploaded to the NFV-MANO as a VNF package. The MEC system acknowledges that the application package is uploaded to the NFV-MANO. In addition, one MEC application may belong to more than one MEC system.

In step 801, the MEAO in the MEC system sends a subscribe request to the NFVO in the NFV-MANO with a filter for notifications which are related to VNF instantiation.

In step 802, the OSS/BSS requests the NFV-MANO to instantiate a VNF instance based on the application package. The deployment location constraints are also sent to the NFV-MANO.

In step 803, after the VNF instance is instantiated as required, the NFV-MANO sends a response to the OSS/BSS.

It should be noted that, if there are no deployment location constraints in the request or the NFV-MANO has updated the deployment location constraints based on information of VNF instantiated location, the VNF instantiated location information is sent in the response as a parameter.

In step 804, the NFVO in the NFV-MANO sends a notification to the MEAO with the VNF instance information. Details of the VNF instance information can be ascertained by referring to the paragraphs above and will not be repeated herein.

In step 805, the MEAO selects an MEC host based on the VNF instance information (e.g., the deployment location constraints). The MEAO sends a first configure application request to the MEPM-V which manages the selected MEC host, wherein the VNF instance information is included in the first configure application request as a parameter.

In step 806, the MEPM-V sends a second configure application request to the MEP on the selected MEC host, wherein the VNF information is included in the second configure application request as a parameter.

In step 807, the MEP sends a first configure application response to the MEPM-V. The MEPM-V sends a second configure application response to the MEAO.

Figure 9:
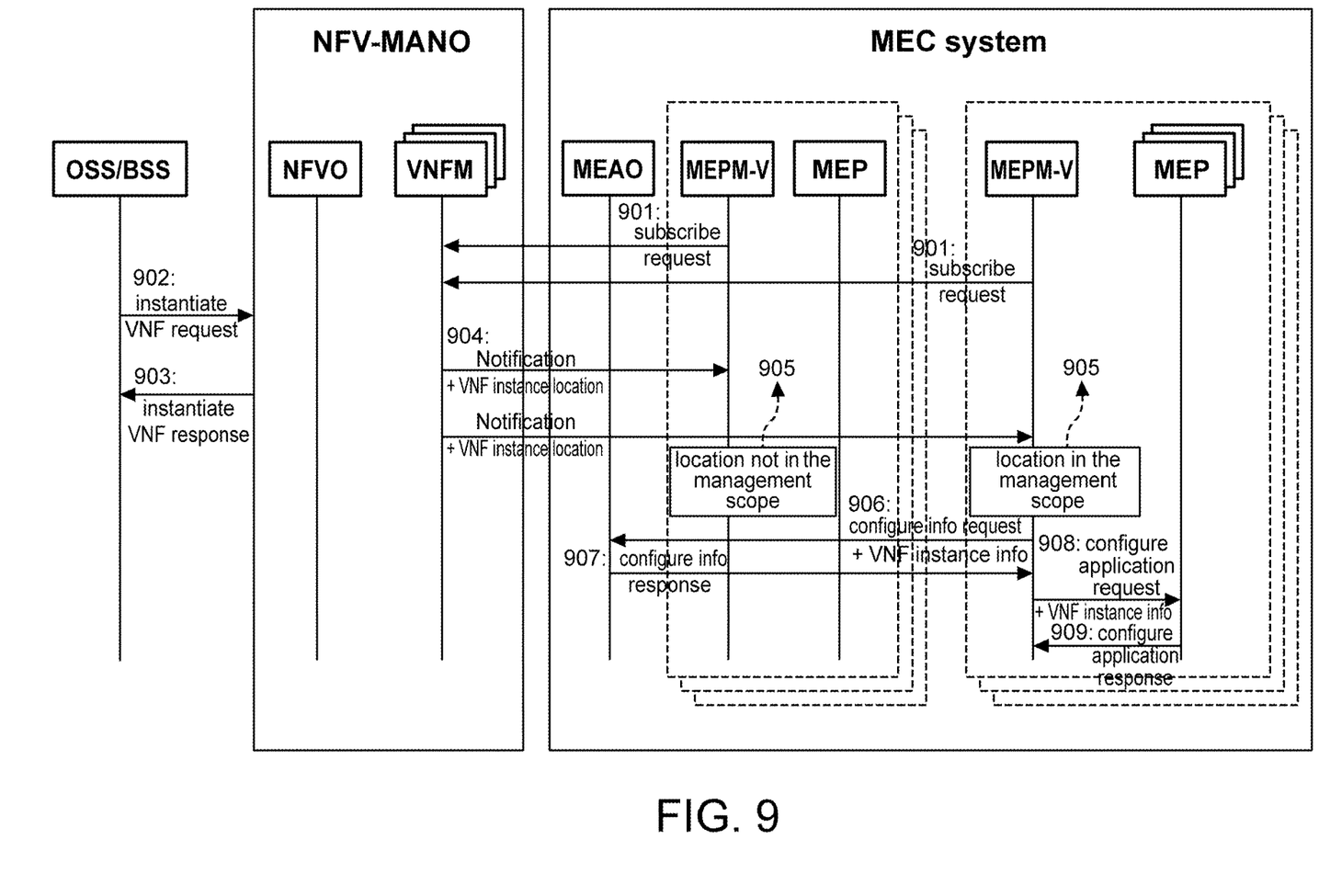
FIG. 9 shows a schematic diagram a method according to an embodiment of the present disclosure.

FIG. 9 shows a schematic diagram of a method according to an embodiment of the present disclosure. The method shown in FIG. 9 may be used to extend the interface between the NFV and the MEC system. In FIG. 9, an application package, which includes the application image, has been uploaded to the NFV-MANO as a VNF package. The MEC system acknowledges that the application package is uploaded to the NFV-MANO. It should be noted, one MEC application may belong to more than one MEC system. In single MEC system, one application may belong to more than one MEC host.

In step 901, the MEPM-Vs in the MEC system send a subscribe request to the VNFMs in the NFV-MANO with a filter for the notifications which are related to VNF instantiation.

In step 902, the OSS/BSS requests the NFV-MANO to instantiate a VNF instance based on the application package. The deployment location constraints are also sent to the NFV-MANO.

In step 903, the NFVO in the NFV-MANO selects a VNFM based on the deployment location constraints for the instantiation of the VNF instance. After the VNF instance is instantiated as required, the NFV-MANO sends a response to the OSS/BSS.

It should be noted that, if there are no deployment location constraints in the request or the NFV-MANO has updated the deployment location constraints based on information of VNF instantiated location, the VNF instantiated location information is sent in the response as a parameter.

In step 904, the VNFM sends a notification to each of the MEPM-Vs subscribing the notification. The notification includes the VNF instance information. Details of the VNF instance information can be ascertained by referring to the paragraphs above and will not be repeated herein.

In step 905, the MEPM-Vs receive the notification and compare the VNF instance information (e.g., the deployment location constraints) with their own local information, to check that whether the VNF instance information (e.g., the deployment location constraints) in their management scopes (e.g., the management ranges of the MEPM-Vs).

In step 906, the MEPM-V with a matched management scope (e.g., the management range) sends a configure information request to the MEAO, wherein the VNF instance information is included in the configure information request as a parameter.

In step 907, the MEAO selects configure information based on the received VNF instance information. The MEAO sends a configure information response with the configure information to the corresponding MEPM-V.

In step 908, the MEPM-V sends a configure application request to the MEP on the selected MEC host, wherein the VNF information is included in the configure application request as a parameter.

In step 909, the MEP sends a configure application response to the MEPM-V.

Figure 10:
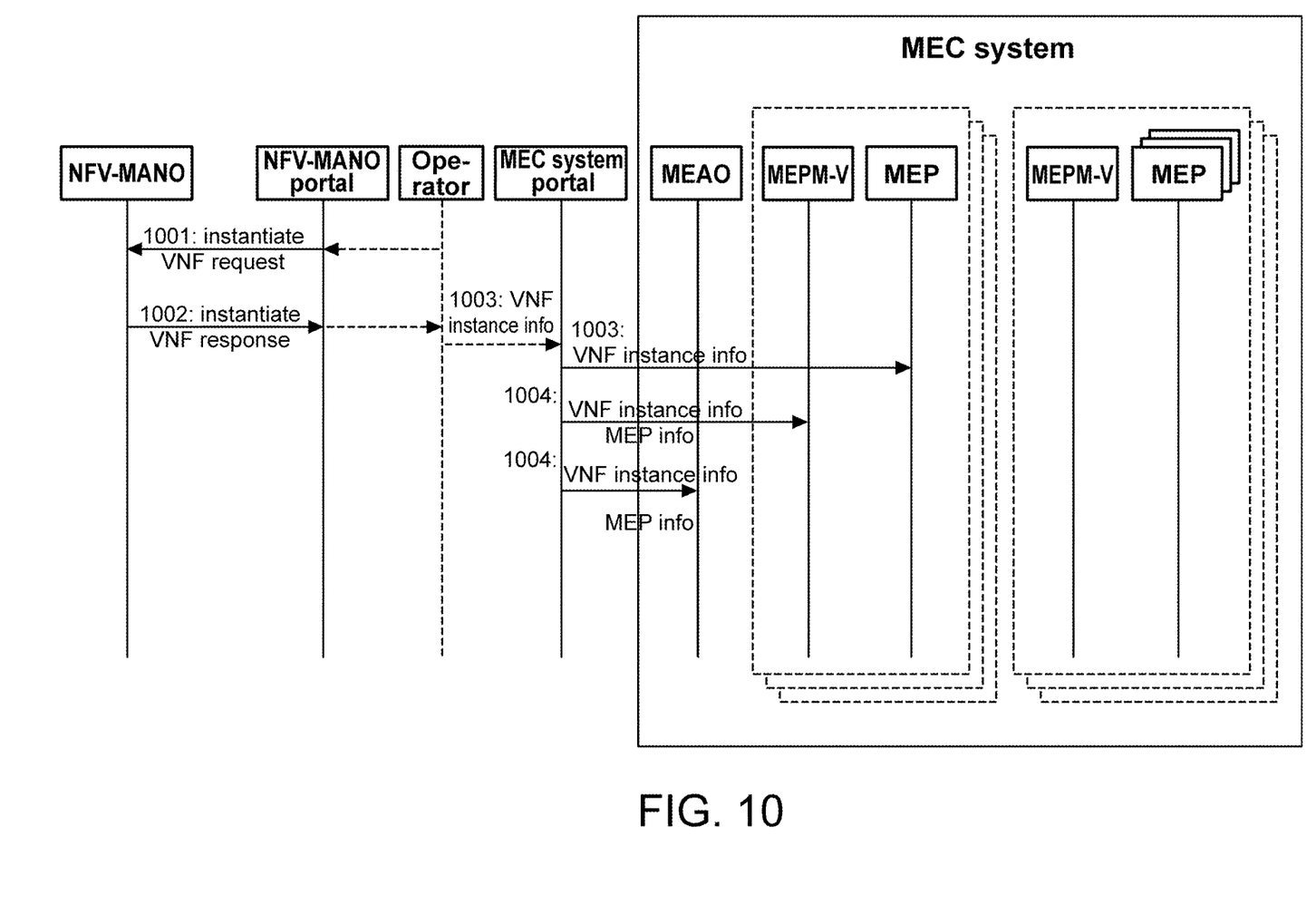
FIG. 10 shows a schematic diagram a method according to an embodiment of the present disclosure.

FIG. 10 shows a schematic diagram of a method of providing VNF instance information according to an embodiment of the present disclosure. The method shown in FIG. 10 may be used to transfer the VNF instance information between the NFV-MANO and MEC system. In FIG. 10, an application package, which includes the application image, has been uploaded to the NFV-MANO as a VNF package.

In an embodiment, the NFV-MANO is a managing system including an NFVO and at least one VNFM. In an embodiment, the NFV-MANO can be regarded as a network node (e.g., a virtualization managing node). In an embodiment, the NFV-MANO can be regarded as a network node including different functions and/or sub-nodes.

Specifically, the operator triggers the NFV-MANO to instantiate a VNF instance for an MEC application through an NFV-MANO portal. The operator selects the application package and deployment location (step 1001).

In step 1002, the operator gets feedback from the NFV-MANO after the VNF instance has been instantiated successfully.

In step 1003, the operator selects an MEC host on the deployment location through an MEC system portal and provides the VNF instance information to the MEP on the MEC host.

In step 1004, the operator provides the VNF instance information through the MEC system portal to the MEPM-V and the MEAO which manages the MEC host. In such a manner, the connection between the VNF instance and the MEC host can be established.

In an embodiment, the present disclose provides a method of directly deploying an MEC application through an NFV-MANO.

In an embodiment, VNF instance information is included in the instantiate application request between the OSS/BSS and the MEAO.

In an embodiment, the VNF instance information is included in the configure application request between the MEAO and the MEPM-V and/or between the MEPM-V and the MEP.

In an embodiment, the VNF instance location information is included in the notification sending from the NFV-MANO to the MEC system.

In an embodiment, a configure information request including the VNF instance information between MEPM-V and MEAO is defined.

In an embodiment, the MEC system portal is extended to transfer the VNF instance information to the MEAO and/or the MEPM-V and/or the MEP.

Figure 11:
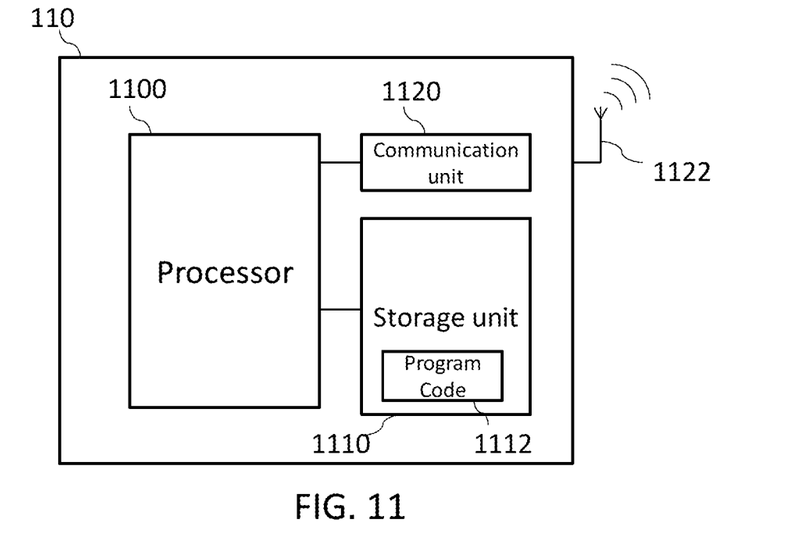
FIG. 11 shows an example of a schematic diagram of a wireless communication node according to an embodiment of the present disclosure.

FIG. 11 relates to a schematic diagram of a wireless communication node 110 according to an embodiment of the present disclosure. The wireless communication node 110 may be a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a data network, a core network, a Radio Network Controller (RNC), an MEPM-V, an MEP, an MEAO, or an NFV-MANO and is not limited herein. In addition, the wireless network node 120 may comprise (perform) at least one network function such as an access and mobility management function (AMF), a session management function (SMF), a user place function (UPF), a policy control function (PCF), an application function (AF), etc. The wireless communication node 110 may include a processor 1100 such as a microprocessor or Application Specific Integrated Circuit (ASIC), a storage unit 1110 and a communication unit 1120. The storage unit 1110 may be any data storage device that stores a program code 1112, which is accessed and executed by the processor 1100. Embodiments of the storage unit 1112 include but are not limited to a subscriber identity module (SIM), read-only memory (ROM), flash memory, random-access memory (RAM), hard-disk, and optical data storage device. The communication unit 1120 may a transceiver and is used to transmit and receive signals (e.g., messages or packets) according to processing results of the processor 1100. In an embodiment, the communication unit 1120 transmits and receives the signals via at least one antenna 1122 shown in FIG. 11.

In an embodiment, the storage unit 1110 and the program code 1112 may be omitted and the processor 1100 may include a storage unit with stored program code.

The processor 1100 may implement any one of the steps in exemplified embodiments on the wireless communication node 110, e.g., by executing the program code 1112.

The communication unit 1120 may be a transceiver. The communication unit 1120 may as an alternative or in addition be combining a transmitting unit and a receiving unit configured to transmit and to receive, respectively, signals to and from another wireless communication node.

A wireless communication method is also provided according to an embodiment of the present disclosure. In an embodiment, the wireless communication method may be performed by using a platform manager node (e.g., an MEPM-V). In an embodiment, the platform manager node may be implemented by using the wireless communication node 110 described above but is not limited thereto.

In an embodiment, the wireless communication method includes receiving, by a platform manager node, virtualization network function, VNF, instance information from a wireless communication node; selecting, by the platform manager node, a multi-access edge computing platform, MEP from candidate MEPs according to the VNF instance information; and transmitting, by the platform manager node, a first configuration request comprising the VNF instance information to the selected MEP.

Details in this regard can be ascertained with reference to the paragraphs above and will not be repeated herein.

Another wireless communication method is also provided according to an embodiment of the present disclosure. In an embodiment, the wireless communication method may be performed by using an orchestrator node (e.g., an MEAO). In an embodiment, the orchestrator node may be implemented by using the wireless communication node 110 described above but is not limited thereto.

In an embodiment, the wireless communication method includes selecting, by an orchestrator node, a multi-access edge platform manager-network function virtualization, MEPM-V, from candidate MEPM-Vs according to VNF instance information; and transmitting, by the orchestrator node, the VNF instance information to the selected MEPM-V, wherein the selected MEPM-V is configured to manage an MEP.

Details in this regard can be ascertained with reference to the paragraphs above and will not be repeated herein.

Another wireless communication method is also provided according to an embodiment of the present disclosure. In an embodiment, the wireless communication method may be performed by using an edge computation platform node (e.g., an MEP). In an embodiment, the edge computation platform node may be implemented by using the wireless communication node 110 described above but is not limited thereto.

In an embodiment, the wireless communication method includes receiving, by an edge computation platform node, VNF instance information from an MEPM-V; wherein the MEPM-V selects the edge computation platform node from candidate nodes according to the VNF instance information.

Details in this regard can be ascertained with reference to the paragraphs above and will not be repeated herein.

Another wireless communication method is also provided according to an embodiment of the present disclosure. In an embodiment, the wireless communication method may be performed by using a virtualization managing node (e.g., an NFV-MANO). In an embodiment, the virtualization managing node may be implemented by using the wireless communication node 110 described above but is not limited thereto.

In an embodiment, the wireless communication method includes transmitting, by a virtualization managing node, VNF instance information to an OSS or a BSS; wherein the VNF instance information is used to select an MEP from candidate MEPs, and the VNF instance information is transmitted to the selected MEP.

Details in this regard can be ascertained with reference to the paragraphs above and will not be repeated herein.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general-purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general-purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according to embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein but is to be accorded the widest scope consistent with the novel features and principles disclosed herein, as recited in the claims below.

We claim:

1. A wireless communication method comprising:
   selecting, by an orchestrator node, a multi-access edge platform manager-network function virtualization (MEPM-V) from candidate MEPM-Vs according to virtualization network function (VNF) instance information, wherein the VNF instance information comprises location information of a corresponding VNF instance; and
   providing, by the orchestrator node, multi-access edge computing (MEC) configuration information to the selected MEPM-V, wherein the selected MEPM-V is configured to manage a multi-access edge computing platform (MEP).

2. The wireless communication method of claim 1, wherein the selected MEPM-V sends configuration information to the MEP, wherein the configuration information includes traffic rules, DNS rules, required and optional services, and services produced by an application instance.

3. The wireless communication method of claim 1, wherein the orchestrator node is configured to receive the VNF instance information from an operations support system (OSS), or
   wherein the orchestrator node is configured to receive a subscribed notification comprising the VNF instance information from a Network Functions Virtualization Orchestrator (NFVO), or
   wherein the MEC configuration information is provided to the selected MEPM-V to allow the selected MEPM-V to transmit a configuration request to the MEP according to the MEC configuration information, or
   wherein the orchestrator node is configured to receive the VNF instance information from an MEC system portal.

4. An orchestrator node, comprising:
a communication unit; and
a processor configured to:
   select a multi-access edge platform manager-network function virtualization (MEPM-V) from candidate MEPM-Vs according to virtualization network function (VNF) instance information, wherein the VNF instance information comprises location information of a corresponding VNF instance; and
   provide multi-access edge computing, MEC configuration information to the selected MEPM-V, wherein the selected MEPM-V is configured to manage a multi-access edge computing platform (MEP).

5. The orchestrator node of claim 4, wherein the selected MEPM-V sends configuration information to the MEP, wherein the configuration information includes traffic rules, DNS rules, required and optional services, and services produced by an application instance.

6. The orchestrator node of claim 4, wherein the processor is configured to receive the VNF instance information from an operations support system (OSS), or
   wherein the processor is configured to receive a subscribed notification comprising the VNF instance information from a Network Functions Virtualization Orchestrator (NFVO), or
   wherein the MEC configuration information is provided to the selected MEPM-V to allow the selected MEPM-V to transmit a configuration request to the MEP according to the MEC configuration information, or
   wherein the processor is configured to receive the VNF instance information from an MEC system portal.

\* \* \* \* \*